(12) United States Patent
Kim et al.

(10) Patent No.: US 9,696,456 B2
(45) Date of Patent: Jul. 4, 2017

(54) METHOD OF PROCESSING A MARINE GRAVITY DATA AND A PROCESSING APPARATUS FOR THE SAME

(71) Applicant: Korea Institute of Geoscience and Mineral Resources, Daejeon (KR)

(72) Inventors: Kyong O Kim, Daejeon (KR); Jin Ho Kim, Daejeon (KR); Gee Soo Kong, Daejeon (KR); Moo Hee Kang, Daejeon (KR); Young Ho Yoon, Daejeon (KR)

(73) Assignee: Korea Institute of Geoscience and Mineral Resource, Daejeon (KR)

( * ) Notice: Subject to any disclaimer, the term of this patent is extended or adjusted under 35 U.S.C. 154(b) by 419 days.

(21) Appl. No.: 14/121,038

(22) Filed: Jul. 23, 2014

(65) Prior Publication Data
US 2015/0234086 A1   Aug. 20, 2015

(30) Foreign Application Priority Data
Feb. 19, 2014   (KR) ........................ 10-2014-0019150

(51) Int. Cl.
*G01V 7/02* (2006.01)
*G01V 7/06* (2006.01)

(52) U.S. Cl.
CPC . *G01V 7/02* (2013.01); *G01V 7/06* (2013.01)

(58) Field of Classification Search
CPC .. G01V 7/00; G01V 11/00; G01V 2210/6165; G01V 7/02; G01V 7/06
See application file for complete search history.

(56) References Cited

U.S. PATENT DOCUMENTS

| 5,390,114 A | 2/1995 | Chapin | |
|---|---|---|---|
| 2004/0260471 A1* | 12/2004 | McDermott | G01V 7/00 702/2 |
| 2011/0264423 A1* | 10/2011 | Wienecke | G01V 11/00 703/2 |

FOREIGN PATENT DOCUMENTS

| KR | 10-2011-0075176 A | 7/2011 | |
|---|---|---|---|
| KR | 10-1076299 | * 10/2011 | ............. G06F 19/00 |

* cited by examiner

*Primary Examiner* — Huan Tran
(74) *Attorney, Agent, or Firm* — Cesari and McKenna, LLP; James A. Blanchette

(57) ABSTRACT

The present invention concerns a method of processing marine gravity data and a processing apparatus for the same. According to the present invention, the processing method comprises obtaining an initial free-air anomaly per profile from raw data; obtaining a filtered free-air anomaly by filtering high-frequency components from the initial free-air anomaly; shifting free-air anomaly by correcting the filtered free-air anomaly based on a reference free-air anomaly; and showing a per-profile free-air anomaly using the reference corrected free-air anomaly.

14 Claims, 21 Drawing Sheets
(18 of 21 Drawing Sheet(s) Filed in Color)

METHOD OF PROCESSING A MARINE GRAVITY DATA AND A PROCESSING APPARATUS FOR THE SAME

CROSS-REFERENCE TO RELATED APPLICATIONS

This application claims the benefit of Korean Patent Application No. 10-2014-0019150 filed on Feb. 19, 2014, the entire contents of which are incorporated herein by reference.

BACKGROUND OF THE INVENTION

Field of the Invention

The present invention concerns a method of processing marine gravity data measured using a marine gravity meter and a processing apparatus for the same.

Background Information

Acquisition of marine gravity data is conducted by a marine gravity meter installed in a ship along the ship sails on the sea. From the raw data, a free-air anomaly and a precise Bouguer anomaly are calculated and are utilized for geophysical and geological research.

The raw data contains a plenty of noise and errors, and in order to acquire an optimal free-air anomaly and precise Bouguer anomaly, such noise and errors need to be processed.

If the raw data is processed per each profile, data quality enhancement can be achieved by noise reduction through filtering, shifting data from comparison with existing data, and easy removal of bad quality data. However, the prior art lacks per-profile data processing and deteriorates free-air anomaly and precise Bouguer anomaly.

PRIOR DOCUMENT

Patent Document

Korean Patent Application Publication No. 2011-0075176 (published on Jul. 6, 2011) U.S. Pat. No. 5,390,114 (issued on Feb. 14, 1995)

SUMMARY OF THE INVENTION

The present invention aims to address the above-described problems and is directed to a method of processing marine gravity data using a per-profile data processing method and a processing apparatus for the same.

According to the present invention, the above-described objects are achieved by a method of processing marine gravity data, the method comprising: obtaining an initial free-air anomaly per each profile from raw data; obtaining a filtered free-air anomaly by filtering high-frequency components from the initial free-air anomaly; obtaining a shifted free-air anomaly by shifting the filtered free-air anomaly based on an existing other free-air anomaly; and showing a per-profile free-air anomaly. Showing the per-profile free-air anomaly may include showing the per-profile free-air anomaly together with at least any one of a water depth, raw data, an Eötvös correction value, and a position and shape of a profile.

The method may further comprise obtaining an edited free-air anomaly by editing bad quality data based on at least any one of the shown water depth, raw data, Eötvös correction value, and position and shape of the profile.

The method may further comprise obtaining a cross-over error corrected free-air anomaly by performing cross-over error correction on the edited free-air anomaly.

The method may further comprise obtaining combined free-air anomaly with other free-air anomaly and performing cross-over error correction on the combined anomaly.

The method may further comprise obtaining a final free-air anomaly by adjusting a gridding interval on the cross-over error corrected combined free-air anomaly; and calculating a precise Bouguer anomaly from the final free-air anomaly.

The reference free-air anomaly may use data measured by a satellite.

Correcting the filtered free-air anomaly may include shifting a value of the filtered free-air anomaly.

According to the present invention, the above-described objects are achieved by a method of processing marine gravity data, the method comprising: preparing for a reference free-air anomaly from existing other data; performing reference correction by comparing the reference free-air anomaly with a free-air anomaly obtained from raw data; and obtaining a per-profile free-air anomaly based on the reference corrected free-air anomaly.

Showing the per-profile free-air anomaly may include showing the per-profile free-air anomaly together with at least any one of a water depth, raw data, an Eötvös correction value, and a position and shape of a profile, and the method may further comprise obtaining an edited free-air anomaly by editing poor quality data based on at least any one of the shown water depth, raw data, Eötvös correction value, and position and shape of the profile; and obtaining a combined free-air anomaly by combining the edited free-air anomaly with other free-air anomaly.

The method may further comprise obtaining a final free-air anomaly by performing cross-over error correction on the combined free-air anomaly; and obtaining a precise Bouguer anomaly from the final free-air anomaly.

The reference free-air anomaly may use data measured by a satellite, and wherein the correction includes shifting a value of the filtered free-air anomaly.

According to the present invention, the above-described objects are achieved by an apparatus of processing marine gravity data, the method comprising: an initial free-air anomaly obtaining unit obtaining an initial free-air anomaly per profile from raw data; a filtering unit obtaining a filtered free-air anomaly by filtering high-frequency components from the initial free-air anomaly; a shifting unit obtaining a shifted free-air anomaly by shifting the filtered free-air anomaly based on a reference free-air anomaly; and a per-profile showing unit showing a per-profile free-air anomaly.

The per-profile showing unit may show the per-profile free-air anomaly together with at least any one of a water depth, raw data, an Eötvös correction value, and a position and shape of a profile, and the apparatus may further comprise an editing unit obtaining an edited free-air anomaly by editing poor data based on at least any one of the shown water depth, raw data, Eötvös correction value, and position and shape of the profile.

The apparatus may further comprise a first cross-over error correcting unit obtaining a cross-over error corrected free-air anomaly by performing cross-over error correction on the edited free-air anomaly; a combining unit combining the cross-over error corrected free-air anomaly with other free-air anomaly; and a second cross-over error correcting unit obtaining a cross-over error corrected free-air anomaly by performing cross-over error correction on the combined anomaly.

According to the present invention, there are provided a method of obtaining a quality-enhanced free-air anomaly by processing marine gravity data using a per-profile data processing method and a processing apparatus for the same.

BRIEF DESCRIPTION OF THE DRAWINGS

The invention description below refers to the accompanying drawings. The patent or application file contains at least one drawing executed in color. Copies of this patent or patent application publication with color drawing(s) will be provided by the Office upon request and payment of the necessary fee.

DETAILED DESCRIPTION OF AN ILLUSTRATIVE EMBODIMENT

Hereinafter, a method of processing marine gravity data according to the present invention is described in detail with reference to the accompanying drawings.

Figure 1:
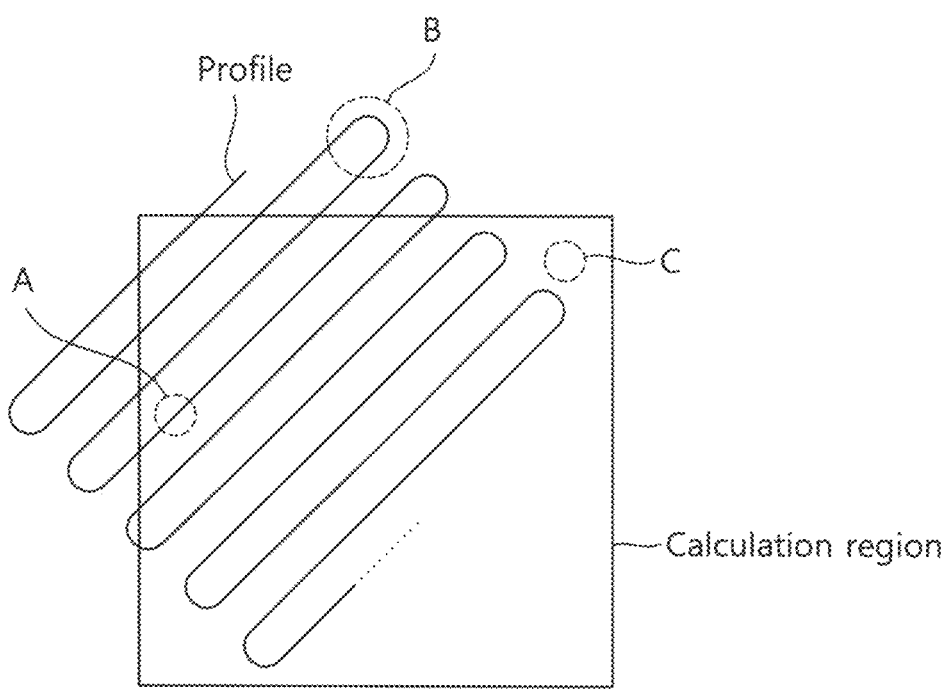
FIG. 1 shows a track line for acquiring raw marine gravity data.

FIG. 1 shows a track line for acquiring raw marine gravity data. A ship equipped with a gravity meter travels on the sea along a zig-zag pathway, i.e., a profile. The profile consists of a straight section A and a curved section B connecting the straight section A. Where a travelling pathway is positioned is denoted a measurement region, and this may differ from a calculation region where a gravity should be calculated as shown in the drawings.

Figure 2:
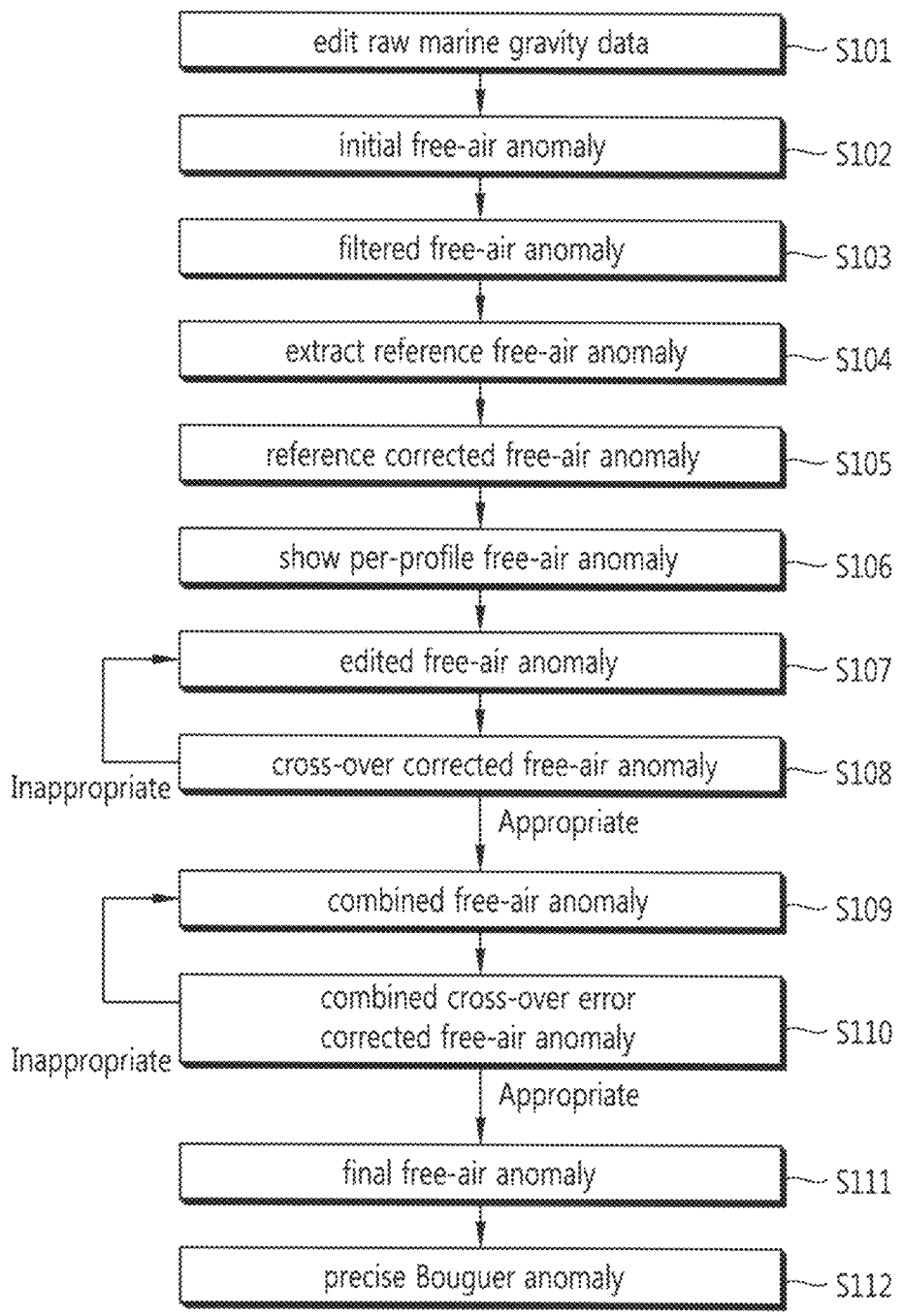
FIG. 2 is a flowchart illustrating processing of a marine gravity data according to an embodiment of the present invention.

FIG. 2 is a flowchart illustrating processing marine gravity data according to an embodiment of the present invention. The whole or part of a process described below may be implemented through computer programming.

Figure 3:
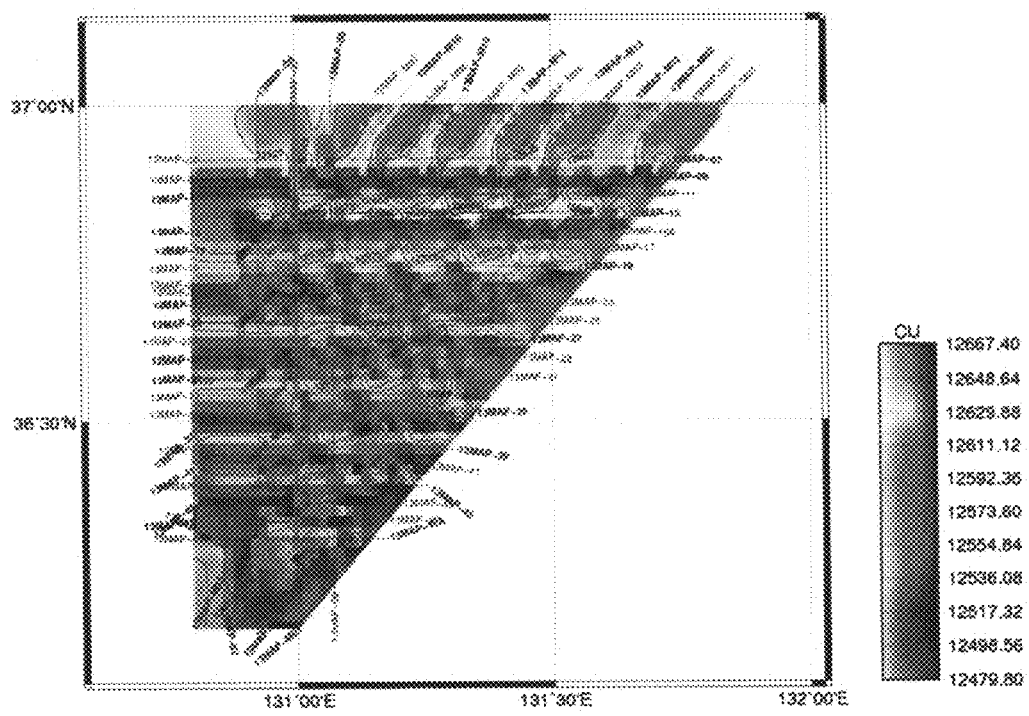
FIG. 3 is a view illustrating raw marine gravity data.

First, raw data is edited as shown in FIG. 3, thus obtaining raw marine gravity data (S101). The raw data includes various data, such as latitude, longitude, water depth, gravity, and time. Among them, only data necessary to obtain a free-air anomaly is extracted, and a line name, start time, and end time of a profile are entered to form per-profile data from which a drawing is created.

Figure 4:
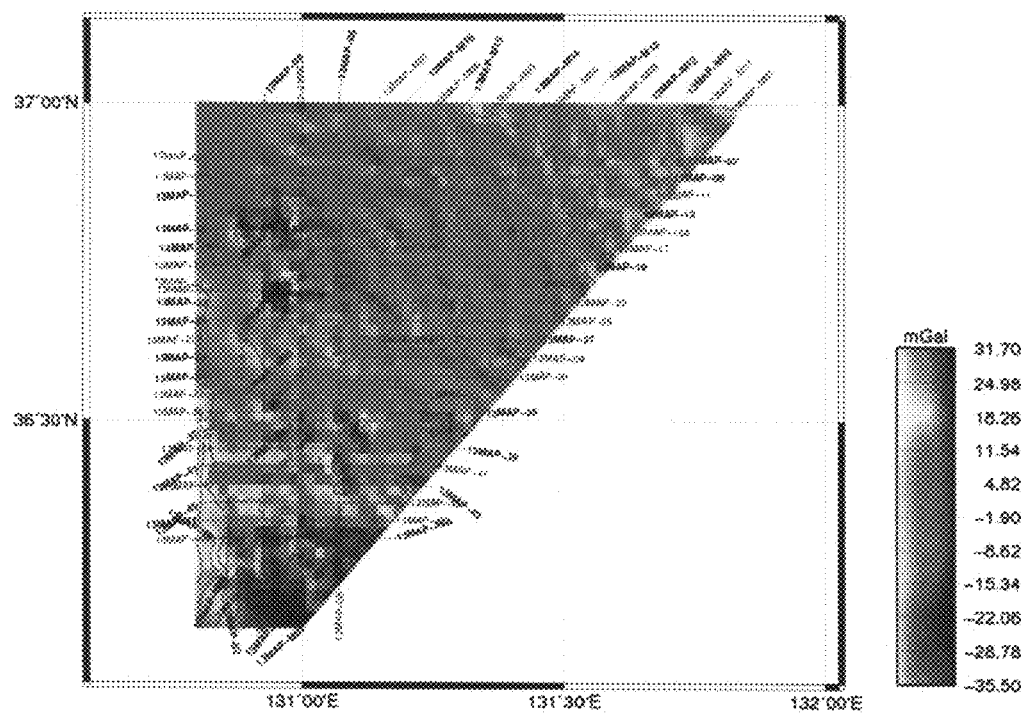
FIG. 4 shows an initial free-air anomaly.

Thereafter, the raw data is subjected to various corrections, yielding an initial free-air anomaly as shown in FIG. 4 (S102). The corrections are as follows. The raw data contains effects made by the attracting forces of the sun and moon, and thus, such effects should be corrected. This is referred to as tidal correction. The tidal correction is conducted using an equation of calculating attracting forces of the sun and moon. The gravity is measured as a specially manufactured spring varies its length. The length of the spring varies over time regardless of the gravity, and thus, this should be corrected. This is denoted meter drift correction. The meter drift correction is carried out in such a way that the gravity of a ship is compared between the port of departure and the port of arrival and a gap in the gravity is corrected. The gravity is the sum of universal gravitation and centrifugal force, and a move of a ship may cause a change in the centrifugal force. Thus, such change needs to be corrected, and this is referred to as Eötvös correction. The Eötvös correction is carried out using the ship's exact speed and direction data. After such corrections, a normal gravity equation is put to use to calculate a difference from a normal gravity value, thereby obtaining an initial free-air anomaly.

Despite going through such various corrections, the initial free-air anomaly still includes error factors because defect-free correction is impossible in reality.

Figure 5:
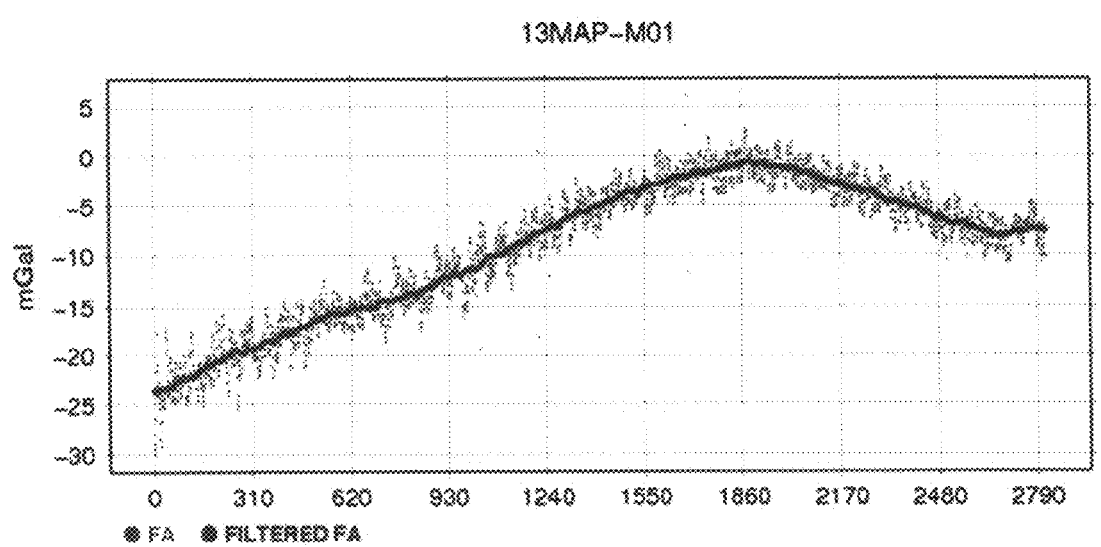
FIG. 5 shows an example of per-profile filtered free-air anomaly.
Figure 6:
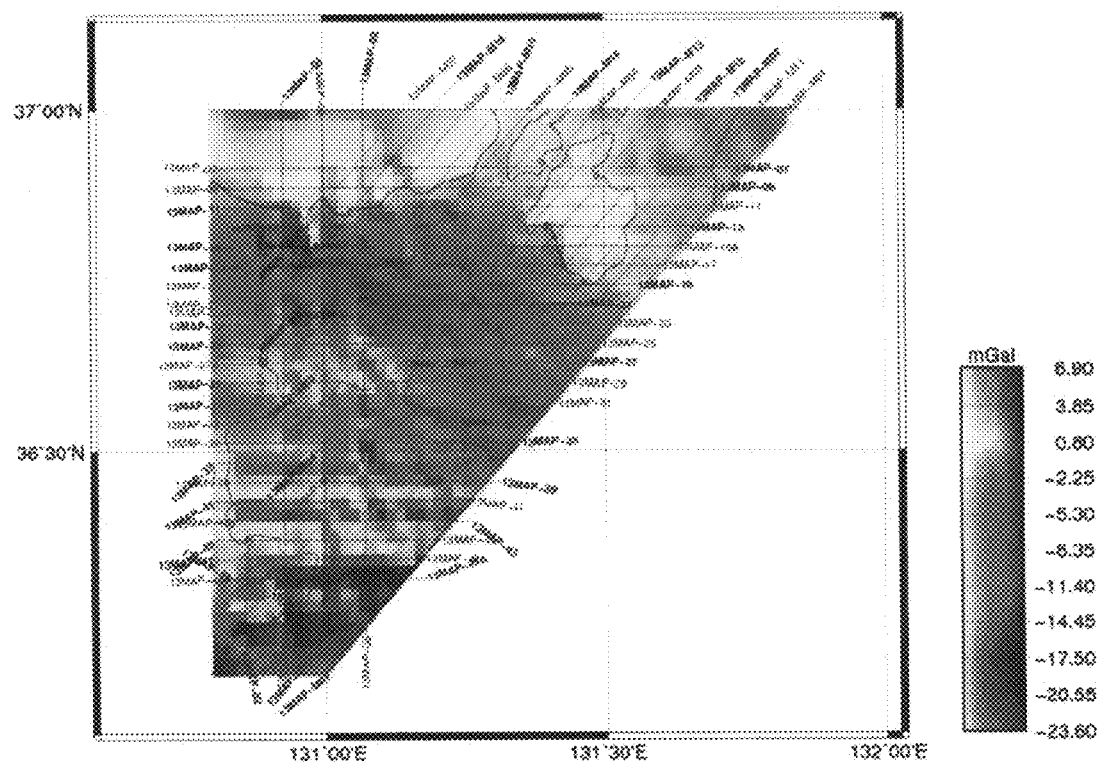
FIG. 6 shows a filtered free-air anomaly.

The initial free-air anomaly undergoes filtering, yielding a filtered free-air anomaly (S103). Filtering may be carried out in such a way as removes high-frequency noise distributed, by using a per-profile moving averaging method as shown in FIG. 5. FIG. 6 shows a filtered free-air anomaly obtained through filtering and it can be seen from FIG. 6 that the range of a free-air anomaly that used to be large due to noise is decreased.

Correction using a reference free-air anomaly includes preparing a reference free-air anomaly (S104) and obtaining a shifted free-air anomaly using the reference free-air anomaly (S105). Since the absolute gravity cannot be measured on the sea, a relative gravity is measured instead. Accordingly, all gravity values are converted into absolute gravity values based on an absolute gravity value on land at the port of departure. However, in some cases, inaccuracy in the absolute gravity value at the port of departure may cause an error in the whole data. Accordingly, data verification through comparison with a reference free-air anomaly is required.

Figure 7:
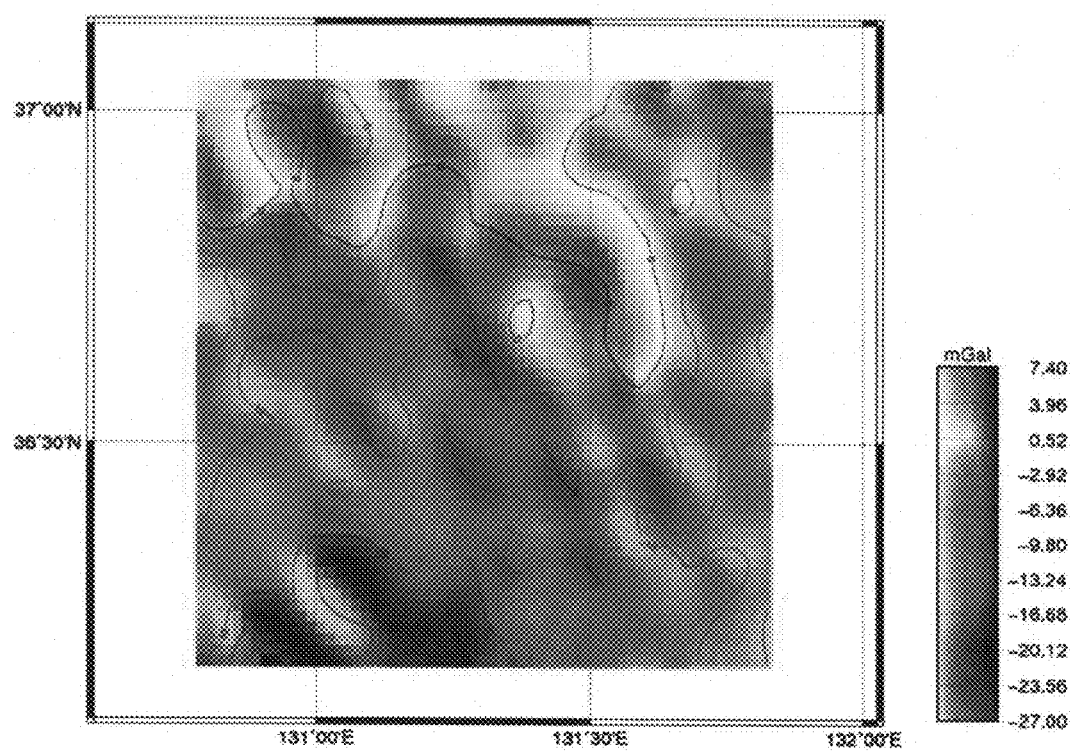
FIG. 7 shows a reference free-air anomaly.

As the reference free-air anomaly, data obtained from a satellite or other data may be put to use, and multiple data may be combined. Extracting the reference free-air anomaly may be performed independently from calculating the filtered free-air anomaly. FIG. 7 shows a reference free-air anomaly.

Figure 8:
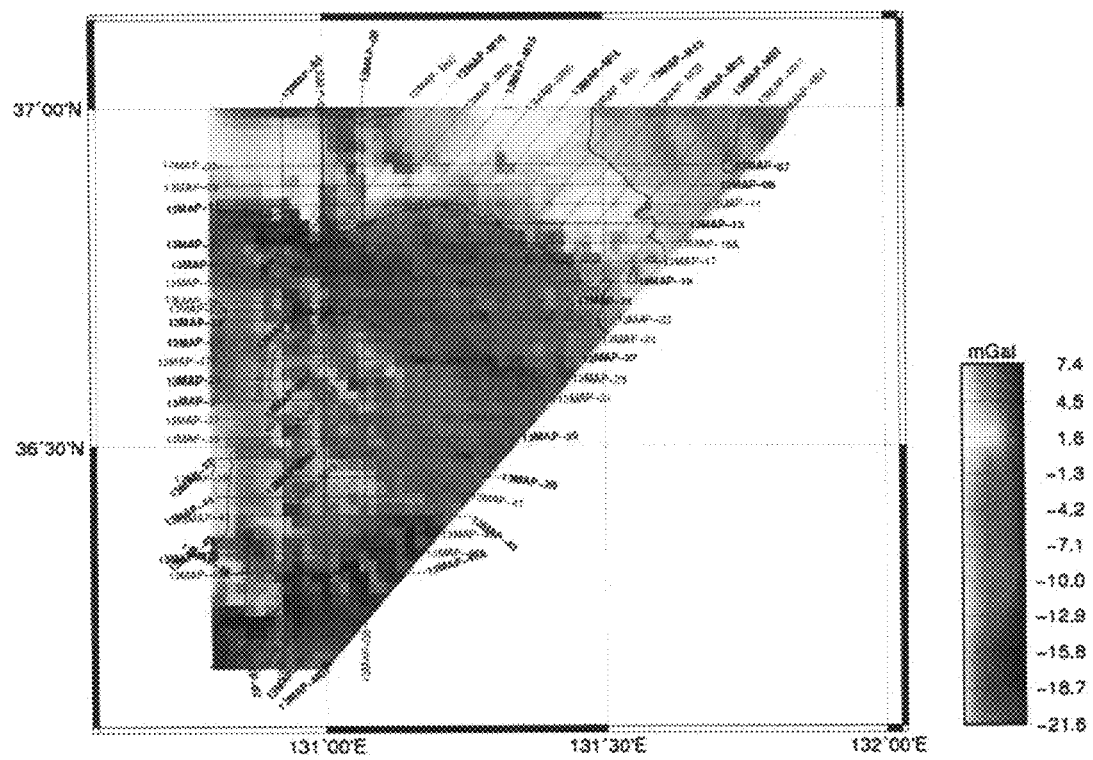
FIG. 8 shows a shifted free-air anomaly.

The reference corrected free-air anomaly may be acquired by shifting the filtered free-air anomaly in consistence with the reference free-air anomaly. In other words, a per-profile filtered free-air anomaly is increased or decreased by a predetermined value. In some cases, the filtered free-air anomaly may be used as the reference corrected free-air anomaly without shifting. FIG. 8 shows a reference corrected free-air anomaly obtained using a reference free-air anomaly. When determined to be unnecessary in this step, shifting may be skipped, and in such case, the filtered free-air anomaly becomes the reference corrected free-air anomaly.

Figure 9:
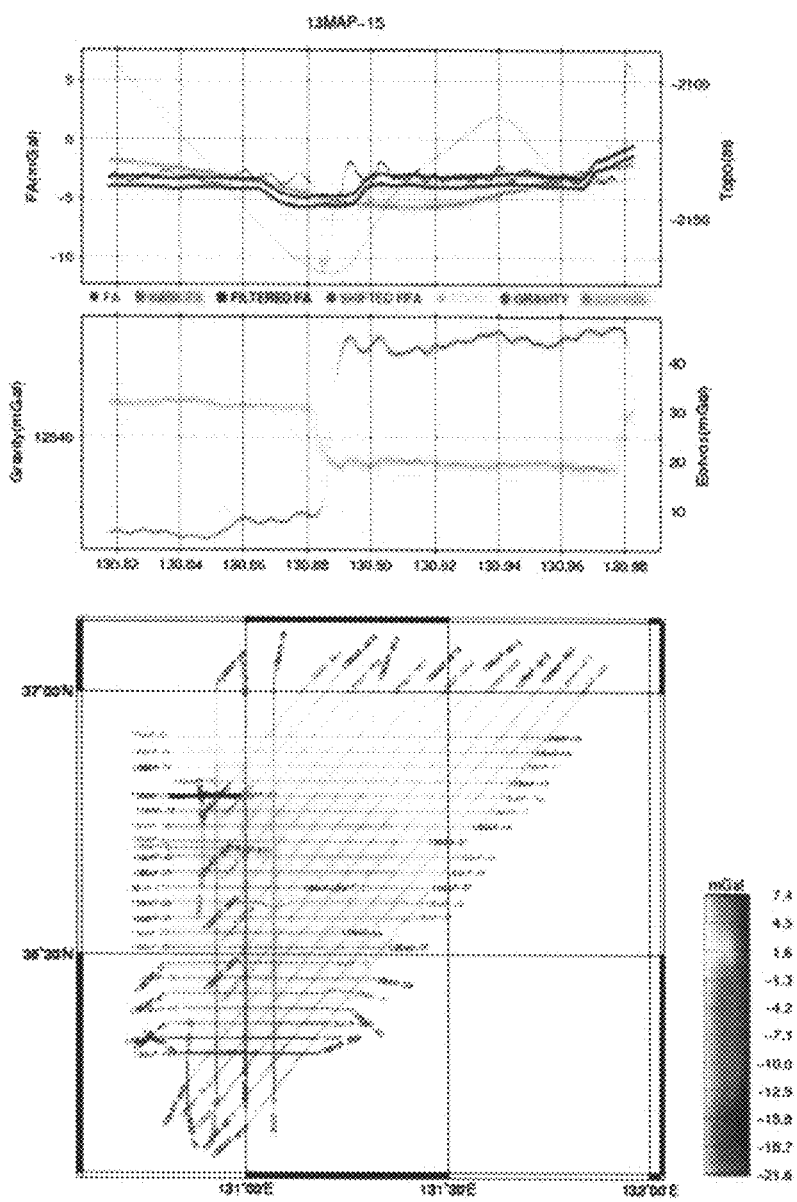
FIG. 9 shows per-profile information related to the quality of a free-air anomaly in order to edit a poor quality free-air anomaly.

FIG. 9 shows a free-air anomaly for a specific profile, alongside critical information relating to the quality of the free-air anomaly (water depth, raw data, Eötvös correction values, and position and shape of profile), in order to determine whether there is poor quality data (S106). Even after the above-described corrections have been done, unpredictable errors that are caused due to incompleteness of corrections and temporary malfunction of gravity meter are still in existence. Poor quality data containing such errors need to be determined and removed by a person who processes the data. For such purpose, a drawing as shown in FIG. 9 should be inevitably created. However, existing drawing creating schemes require lots of time and efforts in creating a drawing as shown in FIG. 9 for all profiles and the existing schemes thus omit such process. According to the present invention, creating a drawing is automated, and once a drawing creating automation program is executed, a drawing as shown in FIG. 9 for all profiles may be created within a short time. In the instant embodiment, 44 profiles are offered, and a drawing as shown in FIG. 9 may be autonomously created for each of the 44 profiles. Among the 44 profiles, the locations of corresponding profiles are marked on the lower part of FIG. 9 (in thick black).

Figure 10:
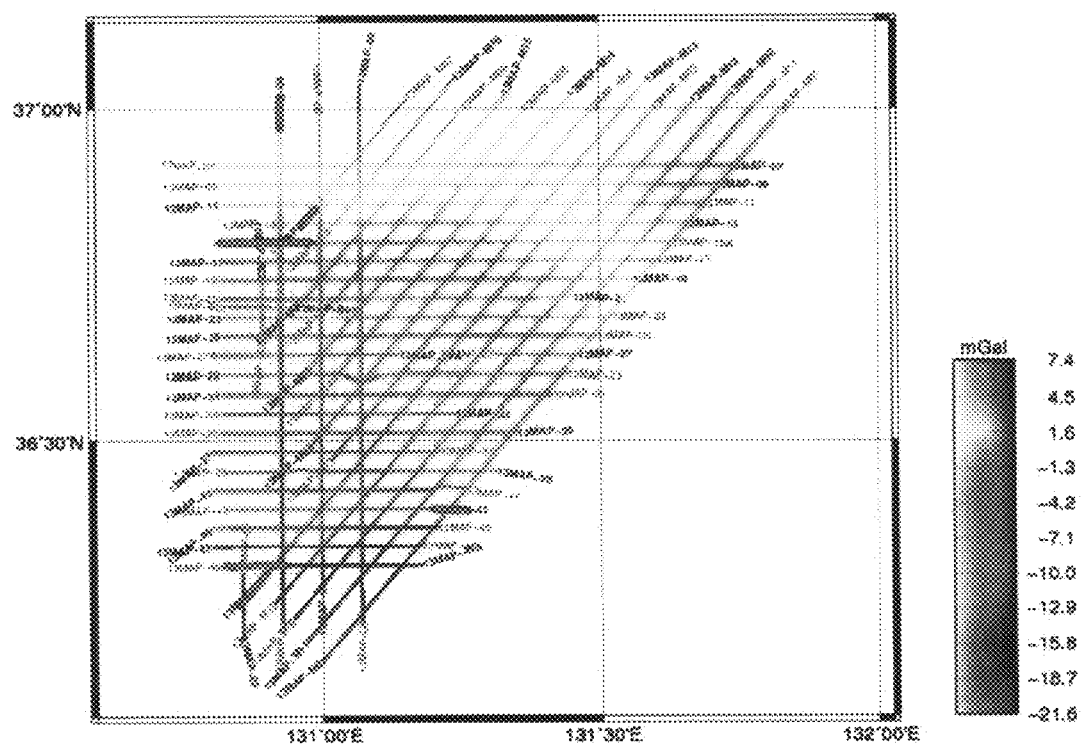
FIG. 10 shows the position of edited free-air anomaly.
Figure 11:
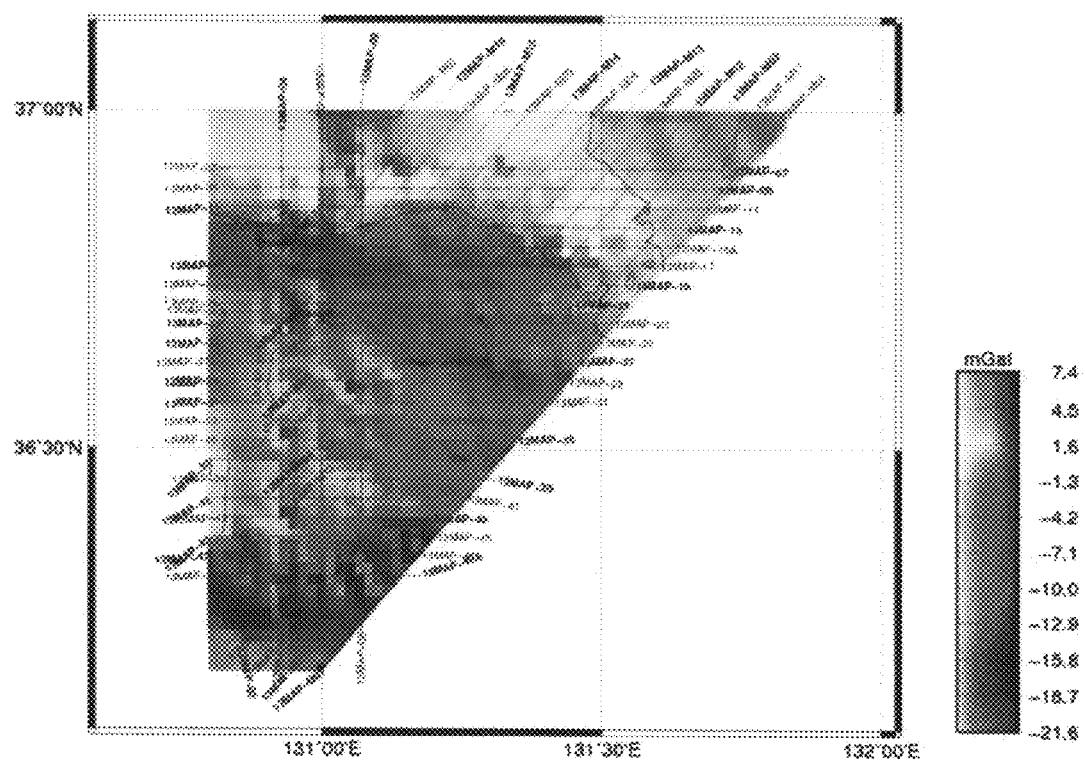
FIG. 11 shows an edited free-air anomaly with a poor quality free-air anomaly removed.

Next, the person who processes data edits the reference corrected free-air anomaly that is determined to be poor quality data by referencing the per-profile drawing created as shown in FIG. 9 (S107). As shown in the upper part of FIG. 9, according to this embodiment, data between longitude 130.86 degrees and longitude 130.90 degrees is determined to be poor. Such longitude range or latitude range is input to a software program for editing, and the portion is then autonomously edited. FIG. 10 shows data (shown in red) determined to be poor, and FIG. 11 shows an edited free-air anomaly that is a result of removing poor quality data.

Thereafter, a cross-over error correction is conducted, yielding a cross-over error corrected free-air anomaly (S108). Theoretically, when one point is passed twice upon measurement, the values should be completely consistent with each other. However, despite going through all of the above-described corrections, errors normally occur. Such errors are referred to as cross-over errors. In accordance with cross-over error correction, an arithmetic average is calculated on two or more different values at cross-over points, and this average is determined as a true value of the cross-over points. Then, the remaining values between the cross-over points are subjected to linear correction. In case the gap between values at the cross-over points is so large that correction is inappropriate, free-air anomaly editing is re-done to further rid poor data, and the above step may be then re-performed.

Figure 12:
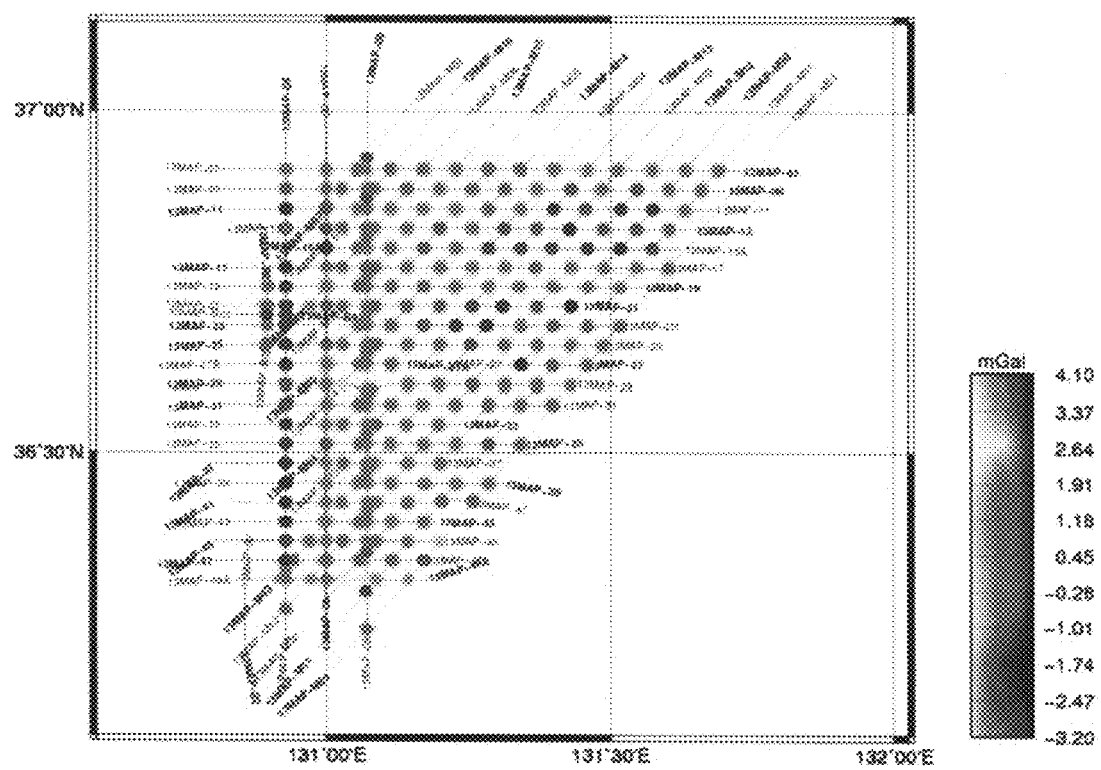
FIG. 12 shows cross-over error of edited free-air anomaly prior to cross-over error correction.
Figure 13:
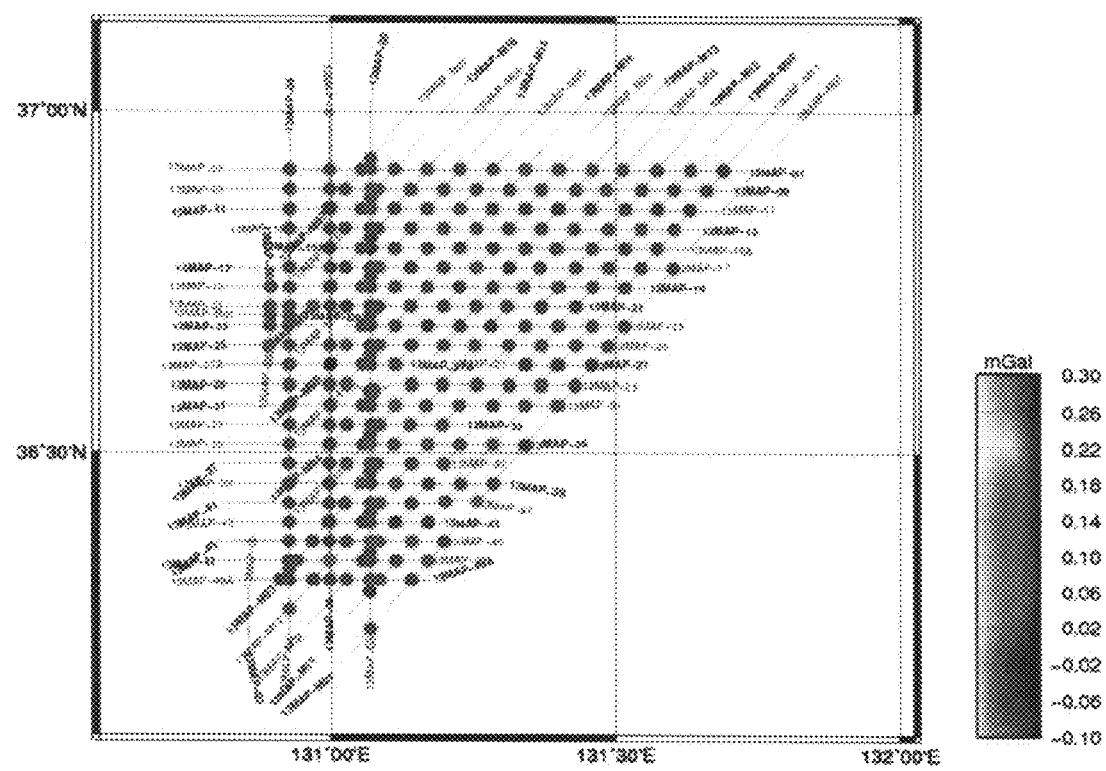
FIG. 13 shows cross-over errors of edited free-air anomaly after cross-over error correction.

FIG. 12 shows cross-over errors of a free-air anomaly before cross-over error correction, and FIG. 13 shows cross-over errors of a free-air anomaly after cross-over error correction.

Comparison between FIGS. 12 and 13 shows the free-air anomaly range has been significantly reduced by cross-over error correction.

Figure 14:
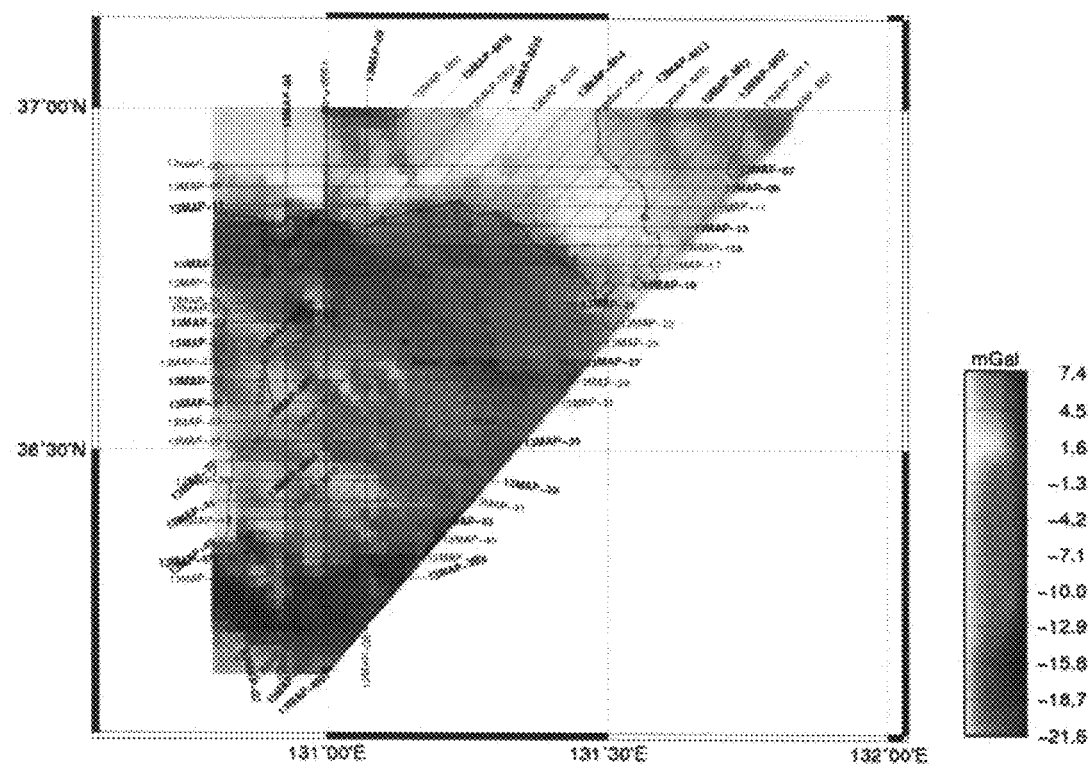
FIG. 14 shows a cross-over corrected free-air anomaly after cross-over error correction.

FIG. 14 shows a cross-over error corrected free-air anomaly reflecting cross-over error correction.

Figure 15:
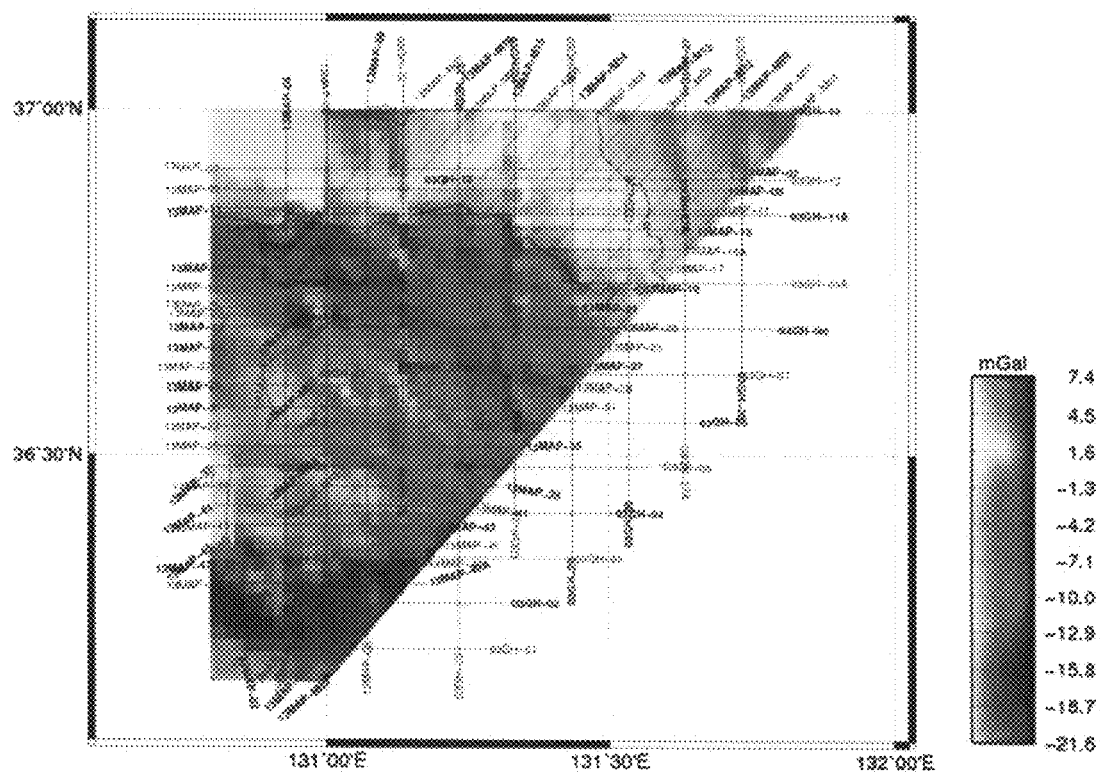
FIG. 15 shows combined free-air anomaly with other free-air anomaly.

Subsequently, the combined free-air anomaly is combined with other free-air anomaly that is present in the existing calculation region (S109). Through this process, data on the unmeasured portion as shown in FIG. 1(C) may be compensated. FIG. 15 shows a combined free-air anomaly.

Figure 16:
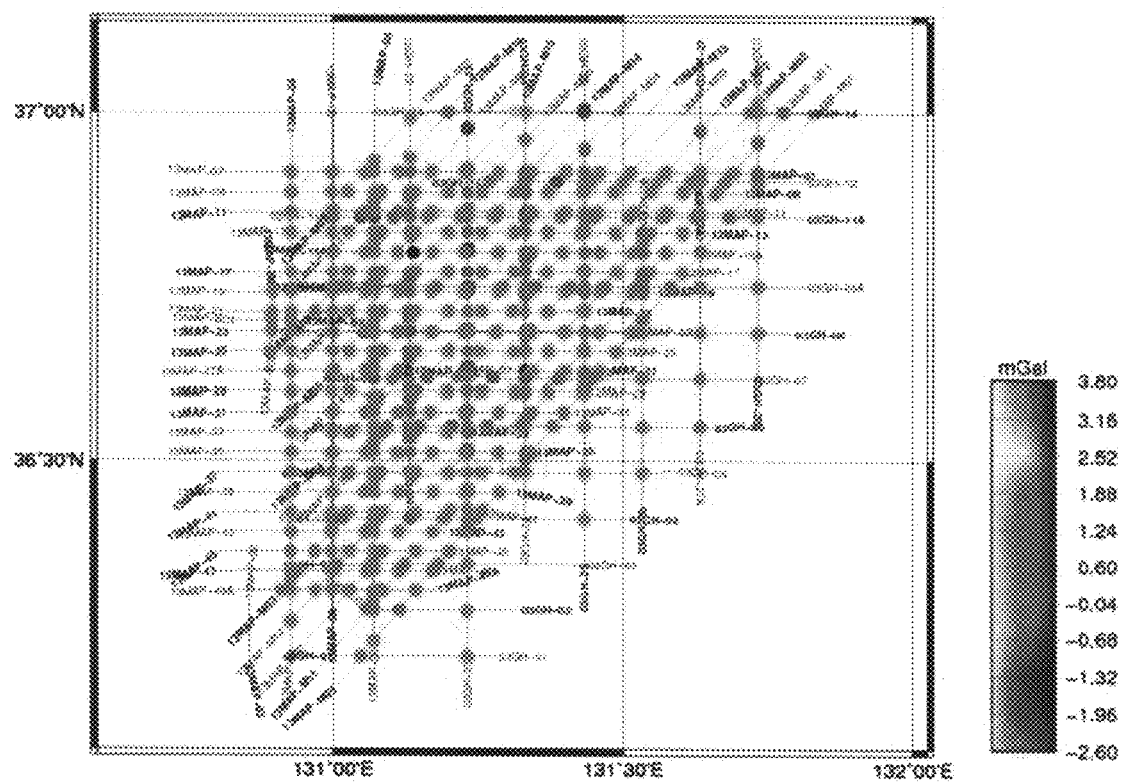
FIG. 16 shows cross-over error of a combined free-air anomaly before cross-over error correction.

Then, cross-over error correction is fulfilled in the same way as shown above, obtaining a combined cross-over error corrected free-air anomaly (S110). FIG. 16 shows cross-over errors of a combined free-air anomaly before correction, and FIG. 17 shows cross-over errors of a combined free-air anomaly after correction.

Figure 17:
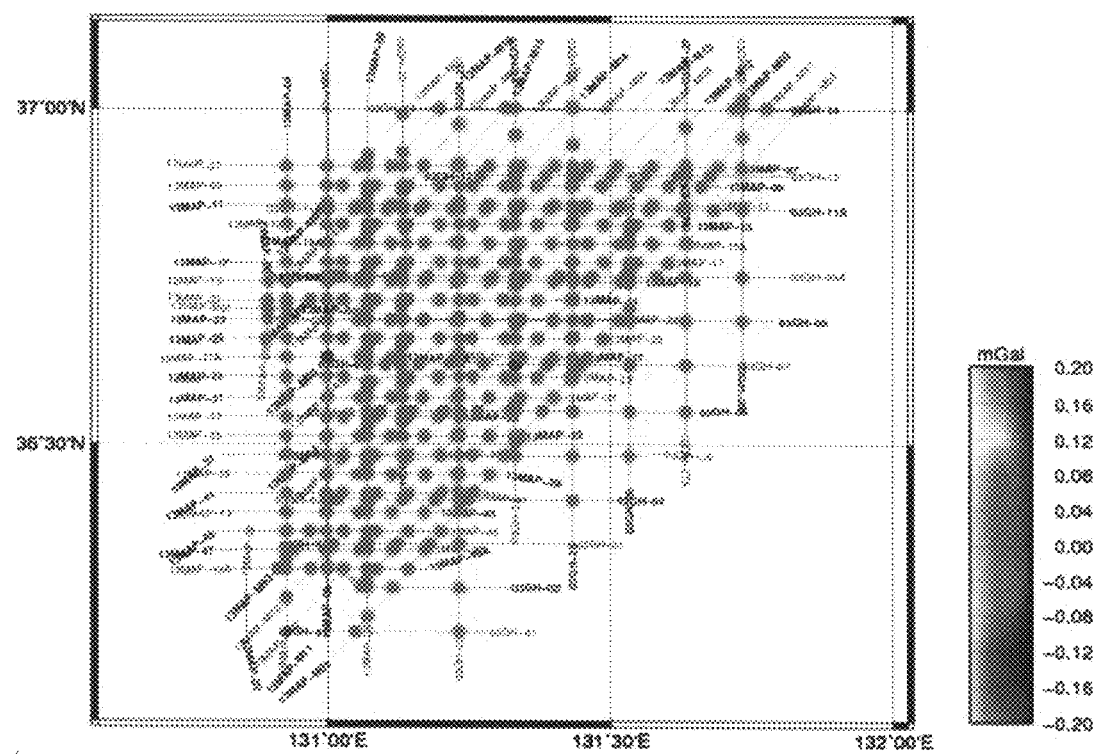
FIG. 17 shows cross-over errors of a combined free-air anomaly after cross-over error correction.

It can be seen from FIGS. 16 and 17 that the free-air anomaly error range has been significantly reduced by cross-over error correction.

Figure 18:
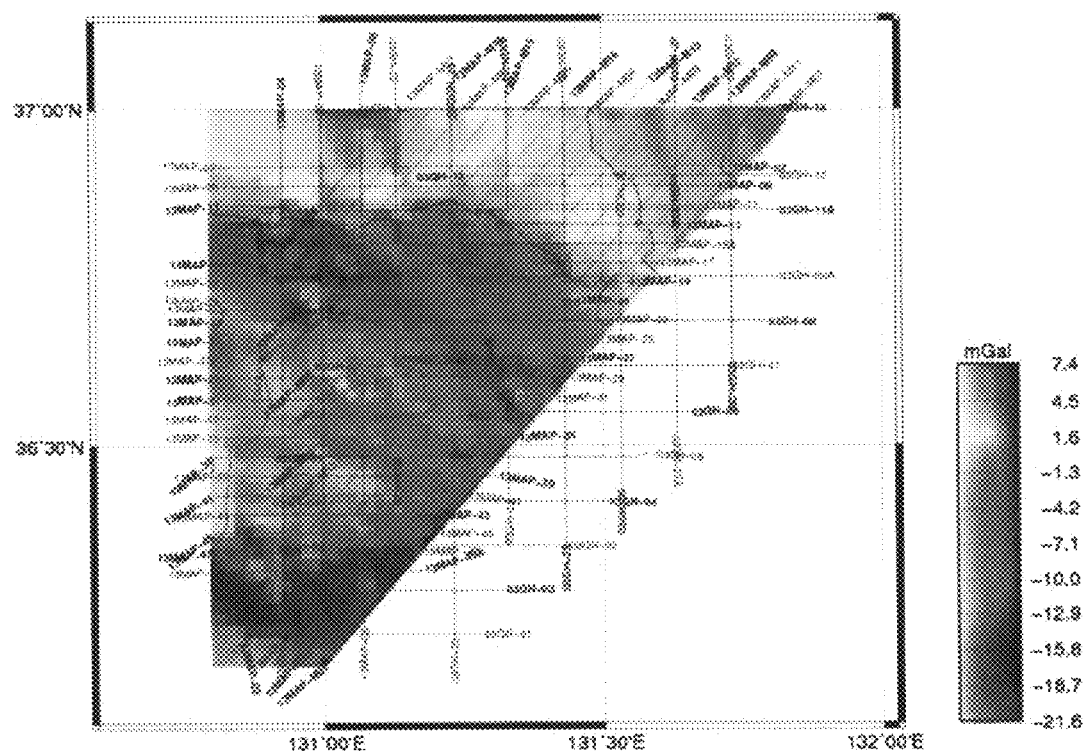
FIG. 18 shows a combined cross-over error corrected free-air anomaly after cross-over error correction.

FIG. 18 shows a combined cross-over error correction free-air anomaly reflecting cross-over error correction.

Thereafter, gridding gap adjustment is performed to thus yield a final free-air anomaly (S111). To fit the purposes of research using gravity data, short-wavelength component-emphasized data or long-wavelength component-emphasized data is needed, and it is rendered possible by adjusting the gridding gap upon gridding the data. In other words, such data may be obtained that long-wavelength components are emphasized as the gridding gap increases while short-wavelength components are emphasized as the gridding gap decreases.

Figure 19:
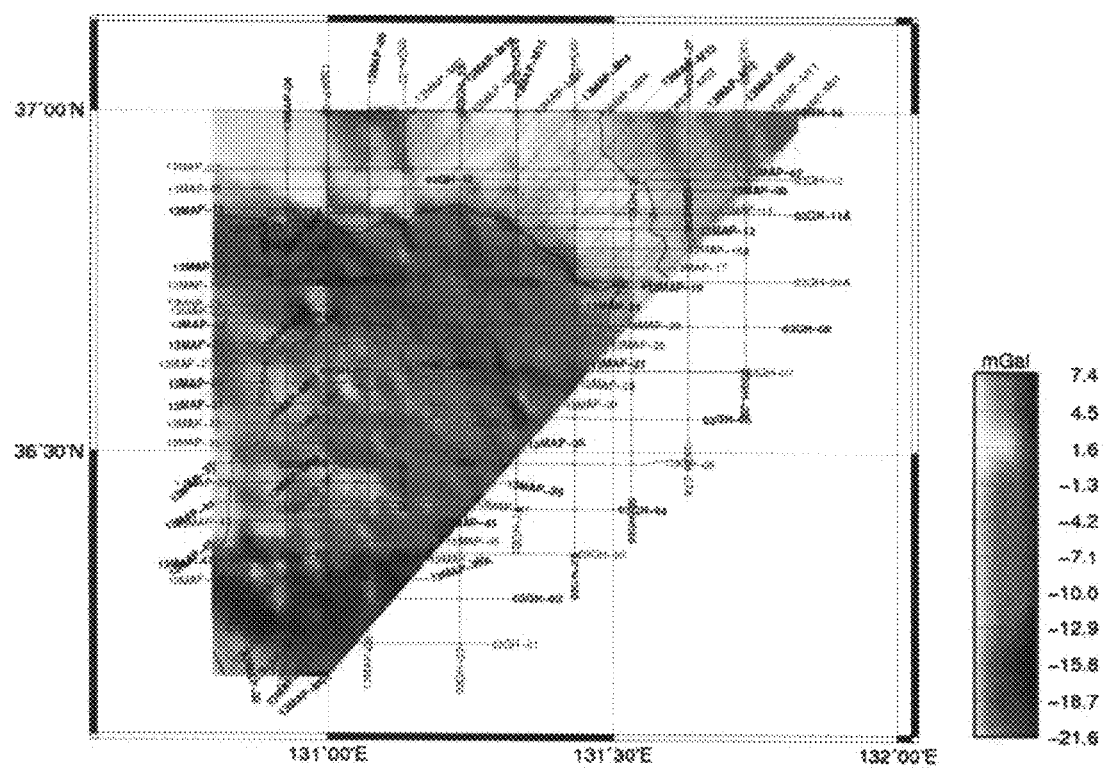
FIG. 19 shows a final free-air anomaly.

FIG. 19 shows a final free-air anomaly.

Figure 20:
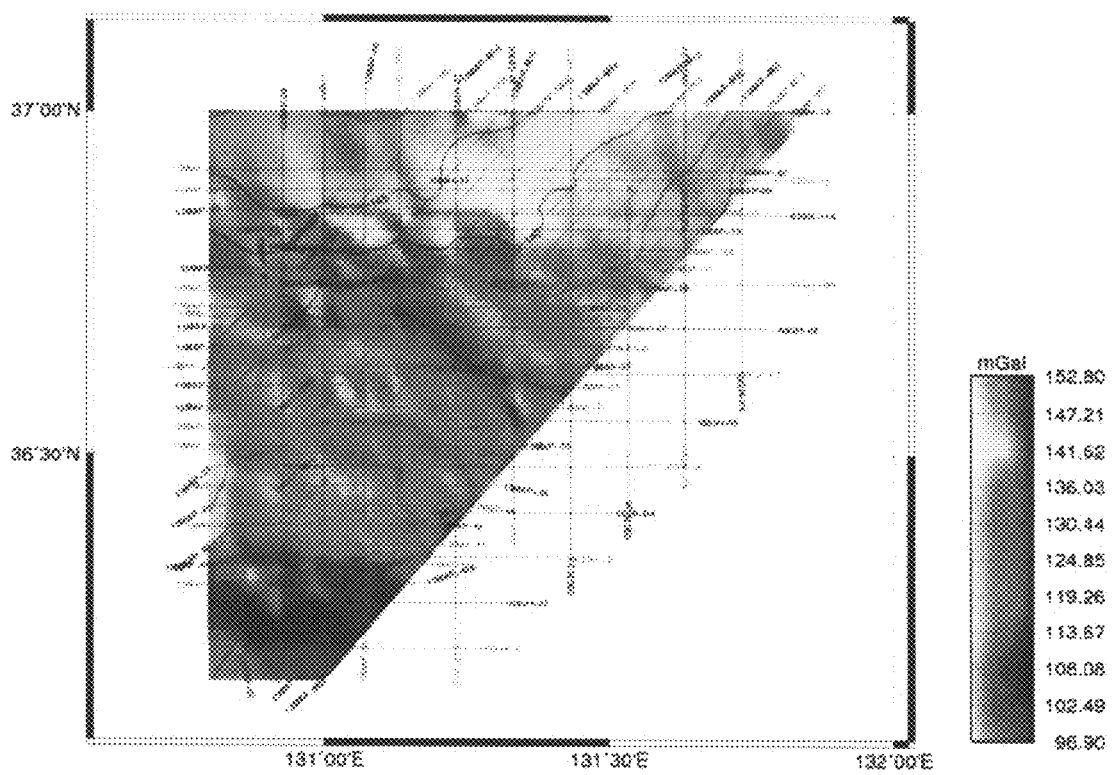
FIG. 20 shows a precise Bouguer anomaly obtained using a final free-air anomaly.

Finally, a precise Bouguer anomaly is obtained from the final free-air anomaly (S112). This step may be conducted by a conventional method. FIG. 20 shows a precise Bouguer anomaly.

Some steps may be omitted from the above-described process, and some order may be changed.

Figure 21:
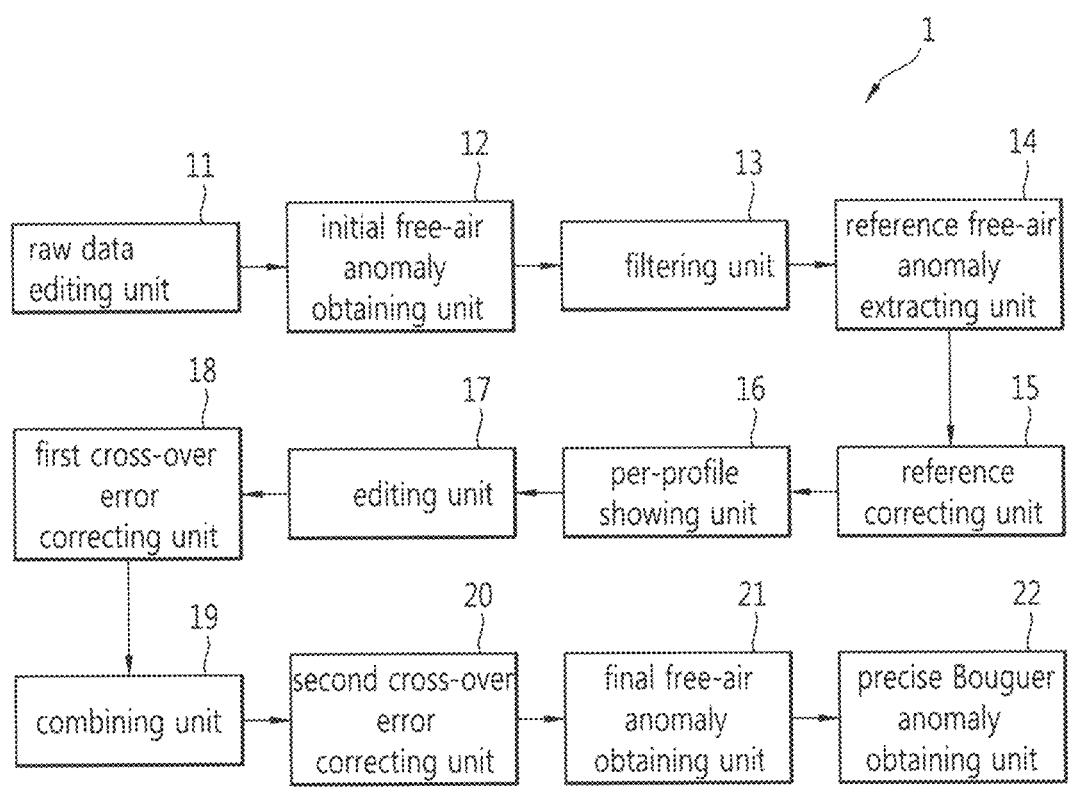
FIG. 21 shows an apparatus of processing marine gravity data according to an embodiment of the present invention.

FIG. 21 shows an apparatus of processing marine gravity data according to an embodiment of the present invention.

The processing apparatus 1 consists of several modules and includes a raw data editing unit 11, an initial free-air anomaly obtaining unit 12, a filtering unit 13, a reference free-air anomaly extracting unit 14, a correcting unit 15, a per-profile showing unit 16, an editing unit 17, a first cross-over error correcting unit 18, a combining unit 19, a second cross-over error correcting unit 20, a final free-air anomaly obtaining unit 21, and a precise Bouguer anomaly obtaining unit 22.

Each module in the processing apparatus 1 may be an execution file written in the FORTRAN programming language, and open source programs, such as Generic Mapping Tools (GMT) and gawk.exe, may be utilized for creating drawings.

The modules respectively correspond to the processing steps shown in FIG. 2. For example, the filtering unit 13 performs the step S103 of removing high-frequency component noise from the initial free-air anomaly to obtain the filtered free-air anomaly, and the editing unit 17 performs the step S107 of editing out poor data from the per-profile free-air anomaly to obtain the edited free-air anomaly.

Although the present invention has been shown and described with reference to to embodiments thereof, it may be understood by those of ordinary skill in the art that various changes in form and detail may be made thereto without departing from the scope of the present invention defined by the following claims.

The invention claimed is:

1. A method of processing marine gravity data, the method comprising:
obtaining an initial free-air anomaly per profile from raw data acquired by a ship equipped with a marine gravity meter traveling along a plurality of profiles on the sea;
filtering out high-frequency components from the initial free-air anomaly using a power-profile moving average method to produce a filtered free-air anomaly;
extracting a reference free-air anomaly from a data source;
calculating a reference corrected free-air anomaly by performing a per-profile comparison for each of the plurality of profiles between the filtered free-air anomaly and the reference free-air anomaly, and shifting the filtered free-air anomaly in response to the reference free-air anomaly; and
showing in a display a per-profile free-air anomaly using the reference corrected free-air anomaly.

2. The method of claim 1, wherein showing the per-profile free-air anomaly includes showing the per-profile free-air anomaly together with at least any one of a water depth, raw data, an Eötvös correction value, and a position and shape of a profile.

3. The method of claim 2, further comprising in response to received user input indicating poor quality data based on at least any one of the shown water depth, raw data, Eötvös correction value, and position and shape of the profile, removing the poor quality data to produce an edited free-air anomaly.

4. The method of claim 3, further comprising obtaining a cross-over error corrected free-air anomaly by performing cross-over error correction on the edited free-air anomaly.

5. The method of claim 4, further comprising obtaining a combined cross-over error corrected free-air anomaly by combining the cross-over error corrected free-air anomaly with other free-air anomaly and performing cross-over error correction on the combined anomaly.

6. The method of claim 5, further comprising:
obtaining a final free-air anomaly by adjusting a gridding gap on the combined cross-over error corrected free-air anomaly; and
calculating a precise Bouguer anomaly from the final free-air anomaly.

7. The method of claim 1, wherein the reference free-air anomaly uses data measured by a satellite.

8. A method of processing marine gravity data, the method comprising:
preparing for a reference free-air anomaly from existing measurement data;
performing reference correction by comparing, for each of a plurality of profiles, the reference free-air anomaly with a free-air anomaly obtained from raw data acquired by a ship equipped with a marine gravity meter traveling along a plurality of profiles on the sea, and shifting the free-air anomaly in response to the reference free-air anomaly to produce a per-profile free-air anomaly based on the reference corrected free-air anomaly; and
showing in a display the per-profile free-air anomaly.

9. The method of claim 8, wherein showing the per-profile free-air anomaly includes showing the per-profile free-air anomaly together with at least any one of a water depth, raw data, an Eötvös correction value, and a position and shape of a profile, and the method further comprising:
in response to received user input indicating poor quality data based on at least any one of the shown water depth, raw data, Eötvös correction value, and position and shape of the profile, removing the poor quality data to produce an edited free-air anomaly; and
obtaining a combined free-air anomaly by combining the edited free-air anomaly with other free-air anomaly.

10. The method of claim 9, further comprising:
obtaining a final free-air anomaly by performing cross-over error correction on the combined free-air anomaly; and
obtaining a precise Bouguer anomaly from the final free-air anomaly.

11. The method of claim 8, wherein the reference free-air anomaly uses data measured by a satellite.

12. An apparatus for processing marine gravity data, comprising:
a processing device; and
software configured to be executed on the processing device, the software including a plurality of software units that when executed by the processing device perform functions, the plurality of software units including:
an initial free-air anomaly obtaining unit configured to obtain an initial free-air anomaly per profile from raw data acquired by a ship equipped with a marine gravity meter traveling along a plurality of profiles on the sea;
a filtering unit configured to filter out high-frequency components from the initial free-air anomaly using a power-profile moving average method to produce a filtered free-air anomaly;
a shifting unit configured to perform a per-profile comparison for each of the plurality of profiles between the filtered free-air anomaly and a reference free-air anomaly, and shift the filtered free-air anomaly in response to the reference free-air anomaly; and
a per-profile showing unit configured to show in a display a per-profile free-air anomaly using the reference corrected free-air anomaly.

13. The apparatus of claim 12, wherein the per-profile showing unit is further configured to show the per-profile free-air anomaly together with at least any one of a water depth, raw data, an Eötvös correction value, and a position and shape of a profile, and the apparatus further comprising an editing unit configured to receive user input indicating poor quality data based on at least any one of the shown water depth, raw data, Eötvös correction value, and position and shape of the profile, and in response to the received user input remove the poor quality data to produce an edited free-air anomaly.

14. The apparatus of claim 13, further comprising:
a first cross-over error correcting unit configured to obtain a cross-over error corrected free-air anomaly by performing cross-over error correction on the edited free-air anomaly;
a combining unit configured to combine the cross-over error corrected free-air anomaly with other free-air anomaly; and
a second cross-over error correcting unit configured to obtain a cross-over error corrected free-air anomaly by performing cross-over error correction on the combined anomaly.

* * * * *